(12) United States Patent
Bieler et al.

(10) Patent No.: US 12,525,000 B2
(45) Date of Patent: Jan. 13, 2026

(54) PROCESS FOR AUTOMATICALLY EXTRACTING TEXT INFORMATION FROM IMAGE FILES

(71) Applicant: PARASHIFT AG, Sissach (CH)

(72) Inventors: Andre Bieler, Bottmingen (CH); Alain Veuve, Sissach (CH)

(73) Assignee: PARASHIFT AG, Sissach (CH)

( * ) Notice: Subject to any disclaimer, the term of this patent is extended or adjusted under 35 U.S.C. 154(b) by 352 days.

(21) Appl. No.: 18/266,879

(22) PCT Filed: Dec. 29, 2021

(86) PCT No.: PCT/CH2021/050028
§ 371 (c)(1),
(2) Date: Jun. 13, 2023

(87) PCT Pub. No.: WO2022/140866
PCT Pub. Date: Jul. 7, 2022

(65) Prior Publication Data
US 2025/0285419 A1    Sep. 11, 2025

(30) Foreign Application Priority Data
Dec. 31, 2020 (CH) .................... 01689/20

(51) Int. Cl.
*G06V 10/00* (2022.01)
*G06V 10/764* (2022.01)
*G06V 10/776* (2022.01)
*G06V 10/778* (2022.01)
*G06V 30/413* (2022.01)

(52) U.S. Cl.
CPC .......... *G06V 10/776* (2022.01); *G06V 10/764* (2022.01); *G06V 10/7788* (2022.01); *G06V 30/413* (2022.01)

(58) Field of Classification Search
CPC ........ G06N 20/00; G06N 20/10; G06N 20/20; G06V 10/82; G06V 10/776; G06V 10/7788; G06V 10/764; G06V 30/413
See application file for complete search history.

(56) References Cited

U.S. PATENT DOCUMENTS 10,402,641 B1 * 9/2019 Dang ................. G06F 16/353
10,706,320 B2 * 7/2020 Filimonova .......... G06V 10/765
11,151,175 B2 * 10/2021 Lourentzou .......... G06F 16/313
(Continued)

*Primary Examiner* — Amir Alavi
(74) *Attorney, Agent, or Firm* — Donald J. Ersler

(57) ABSTRACT

Method for automatic extraction of information from a document file, wherein said document file contains at least one extraction entity in form of a value to be found, wherein a list of different recognizable document types is available, at least one extraction entity is configured for each document type, each extraction entity is assigned a specific extraction model and each extraction model is independent of said document type, with the following steps: Recognition of the document type of said document file using a classification model and Extraction of the information contained an extraction entity contained in the document file using the specific extraction model assigned to the extraction entity which is configured for the recognized document type, wherein at least two different document types are configured to have at least one identical extraction entity with the same assigned extraction model.

4 Claims, 3 Drawing Sheets

(56) References Cited

U.S. PATENT DOCUMENTS

| | | | | |
|---|---|---|---|---|
| 11,455,713 | B2* | 9/2022 | Tang | G06F 16/93 |
| 11,487,797 | B2* | 11/2022 | Shukla | G06F 16/3349 |
| 11,544,943 | B1* | 1/2023 | Rimchala | G06V 30/413 |
| 11,657,631 | B2* | 5/2023 | Sagonas | G06T 7/70 |
| | | | | 382/159 |
| 11,830,270 | B1* | 11/2023 | Bui | G06V 30/10 |
| 12,056,945 | B2* | 8/2024 | Matiukhov | G06N 3/044 |
| 12,159,109 | B2* | 12/2024 | Mahapatra | G06F 40/42 |
| 12,307,687 | B2* | 5/2025 | Sato | G06T 7/246 |
| 2007/0294240 | A1* | 12/2007 | Steele | G06F 16/338 |
| | | | | 707/999.005 |

\* cited by examiner

PROCESS FOR AUTOMATICALLY EXTRACTING TEXT INFORMATION FROM IMAGE FILES

BACKGROUND OF THE INVENTION

1. Field of the Invention

The present invention relates to a method for automatically extracting information from document files according to the preamble of patent claim 1. It falls within the field of digital document processing and optical text recognition.

2. Discussion of the Prior Art

It appears that prior art does not teach or suggest a method for automatically extracting text information from image files.

SUMMARY OF THE INVENTION

Systems for extracting document data have undergone major improvements in the last 10 years. They are used to read any documents, be they paper documents, electronically generated or purely electronic formats, and to bring the data obtained in this way into a structured form that can be used by other business systems.

Attempts are made to create structured data from unstructured or semi-unstructured data. This is basically attempted with two different approaches: template approach and free form recognition.
Template Approach:

With the template approach, a so-called template is created for each document layout, which stores the coordinates of the values to be searched for or previously defined anchor points and thus brings the values into the structure when the document is read. This method works well on its own, but is complex to set up and thus limits the area of application. In addition, the template approach cannot handle layouts that are unknown to the system.
Free Form Recognition:

With free-form recognition, it is attempted to bring values from documents into a structured form using various extraction rules without templates. This procedure works well with a limited set of document variants, since a rule can be defined for each case. However, setting up the rules is time-consuming and can be prone to errors. The free-form recognition approach can handle new documents better than the template approach, but considerable effort is usually required for additional configuration for new document layouts. Such systems are often overwhelmed, particularly when documents contain information previously unknown to the system.

Learning algorithms are being used more and more in document extraction for both approaches and can significantly improve the extraction results, especially if rules and templates are used skillfully and possibly combined. These learning algorithms are each linked/specialized to specific document types. This means that at least one learning algorithm must be available for each document type (FIG. 1).

One possible approach is client-specific learning. In this approach, the learning models are usually trained universally, but are limited to the client in actual use. This means that further learning only takes place within the set of documents processed by the client. If the same system is used by different clients, the same and slightly different learning takes place in parallel. This learning makes the set-up of the systems more expensive and significantly increases the "time-to-solution" for the customer.

Pure machine learning approaches have also become more widespread in recent years. They try to solve the document extraction with a purely data-driven methodology. These systems are delivered with basic learning for each document type and are subject to the same limitations of client-specific learning as the learning systems in the template and free-form approach.

The object of the present invention is to develop a new method which uses the known methods by means of attribution of the learning models to extraction entities (instead of document types). Thus, all users benefit from continuous improvements in extraction methods and models. This enables the economical processing of small amounts of data.

This object is achieved by the method with the features of patent claim 1. Further features and exemplary embodiments will be apparent from the dependent claims and their advantages are explained in the following description.

The figures represent possible exemplary embodiments of the invention, which are explained in the following description.

DETAILED DESCRIPTION OF THE PREFERRED EMBODIMENTS

Figure 1:
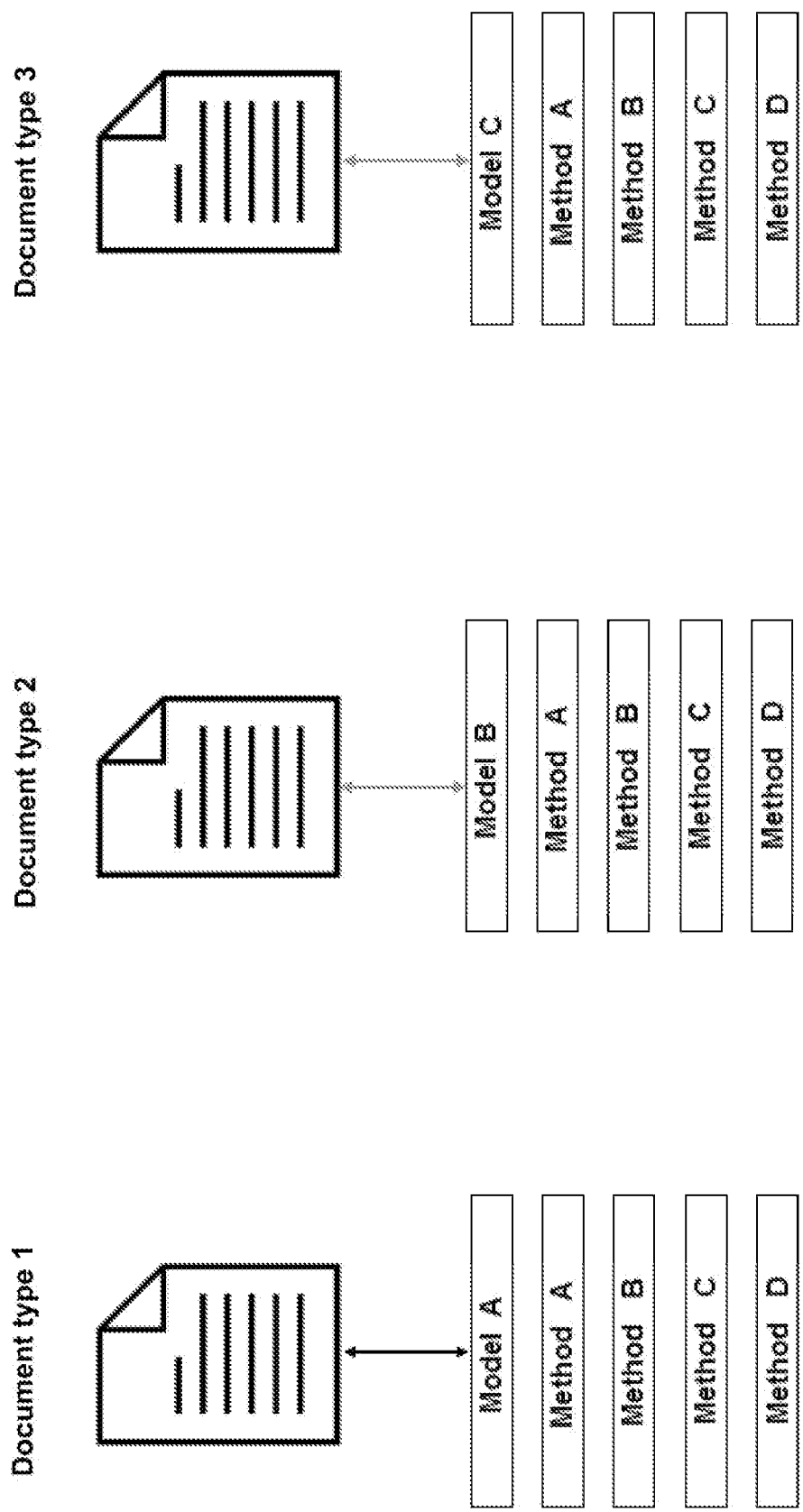
FIG. 1 are three flow charts of extraction with conventional systems (state of the art)
Figure 2:
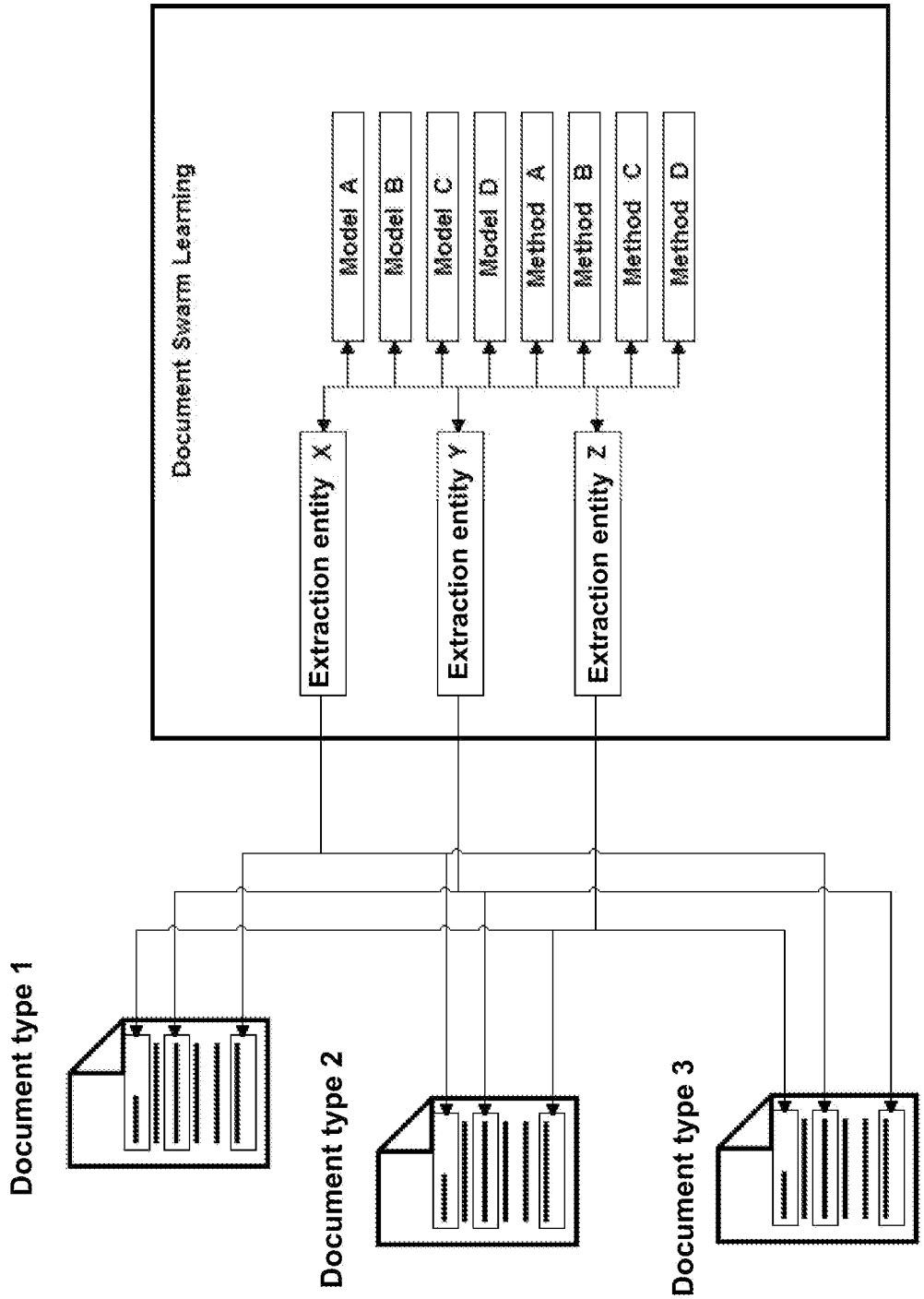
FIG. 2 is a flow chart of learning per extraction entity across document types

The method according to the invention comprises several sub-methods. Attribution of the learning models to extraction entities: Instead of binding the learning models to entire document types as in conventional systems, the new method divides the documents into extraction entities (FIG. 2). Extraction entities represent a structured, normalized value to be found. In a software application, this can be a data field, for example. In FIG. 2, 3 possible entities are shown, which are arranged at different positions in different document types.

This method is used independently of the actual extraction approach 2.1 to 2.4. In this method: a) the extraction entities are separated from the document types and b) the extraction entities are decoupled from the learning models and extraction methods and are newly related to one another.

Learning models and extraction mechanisms can therefore be placed in competition with one another for each extraction entity. In this case, another model maps the evaluation of the respective best learning model and the best extraction method.

Figure 3:
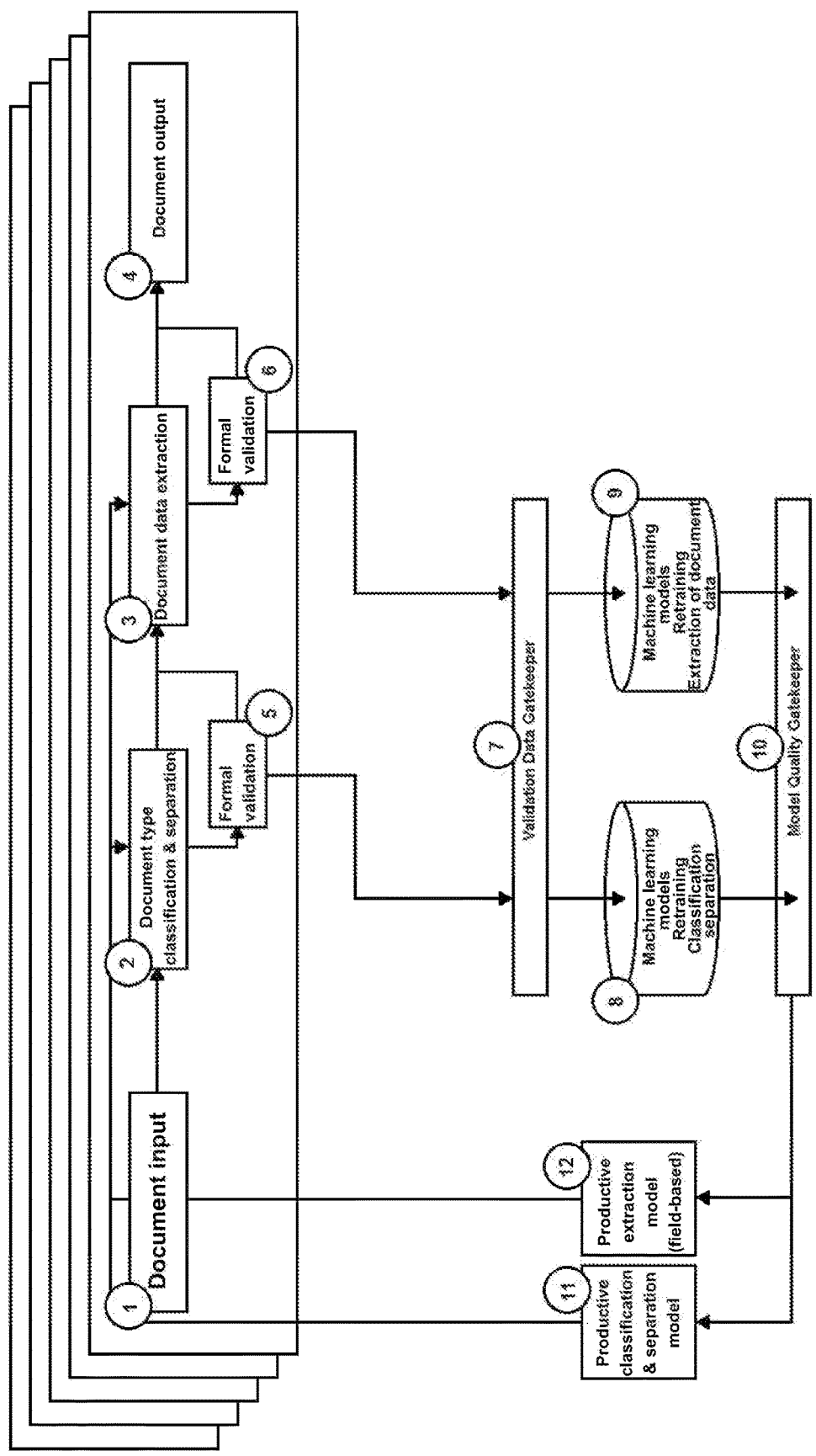
FIG. 3 is a flow chart of document Swarm Learning: "Learning Flow"

This way, learning models can be improved independently of the document type. This improvement means that no additional learning effort is required for the respective client for the same extraction entities. In addition, this method enables the simple configuration of new document types with "pre-learned" extraction entities, which is greatly reduced in terms of time. In addition, the partial method eliminates redundancies in comparison to existing approaches when training the learning models. A second, complementary partial method is shown in FIG. 3, which applies the "attribution of the learning models to extraction entities" to learning in the client network.

Each client maintains a processing pipeline for the documents which comprises the following 4 main steps:

1. Document input

Users upload documents to the platform via the channel of their choice. Any channel is conceivable for an upload.

2. Document type classification & potential age separation

The document is classified as a specific document type. A document separation is carried out if needed. Document separation becomes necessary when the user uploads several documents in one file to the platform. The document classification and document separation takes place by means of the productive classification models 11.

3. Document data extraction

In the next step, the document data is read out. The extraction entities are configured in the document type. The data is extracted using the productive extraction models 12.

4. Document output

After the document data extraction has been completed, the structured data is made available for use or for export.

The following intermediate steps are used in the 4 main steps 5, and 6. Formal validation of classification and extraction results:

The method lets the user check and correct the classification and extraction results. In doing so, the user collects the information necessary to improve the learning models.

7. Validation Data Gatekeeper

The Validation Data Gatekeeper is a component that checks the results of the formal validation and evaluates them from an objective point of view. The aim is to identify data that is not useful for training as early as possible and exclude it from further processing.

8, and 9. Retraining machine-learning models for classification and document data extraction:

The models of the extraction entities are again trained granularly according to the learning of the extraction entities in FIG. 2 with the data obtained through the technical validation and checked by the validation data gatekeeper.

10. Model Quality Gatekeeper

The Model Quality Gatekeeper is a component that compares the performance of trained (historical and competing) models with each other. If one or more models per extraction entity are rated as more efficient, the models are replaced in the current, productive environment 11 and 12.

11. And 12. Productive extraction models

The productive models are continuously used for extraction in the document processing pipeline. They form the basis for reading out the document data for live operation.

A "swarm effect" is achieved by sharing the improved models across all users on the platform. Similarly, all data from the formal validation flows into the improvement of the learning models after quality check. All improvements to the learning models are in turn made available to all users on the platform. The entire learning process is fully automated.

What is claimed:

1. A method for automatic extraction of information from a document file, comprising the steps of:
   providing the document file with at least one extraction entity in the form of a value to be found, wherein a list of different recognizable document types is available, at least one extraction entity is configured for each document type, each extraction entity is assigned a specific extraction model and each extraction model is independent of said document type, with the following steps:
   recognizing the document type of said document file using a classification model; and
   extracting information contained in an extraction entity contained in the document file using the specific extraction model assigned to the extraction entity which is configured for the recognized document type, wherein at least two different document types are configured to have at least one identical extraction entity with the same assigned extraction model; and
   an extraction model is retrained by machine learning based on validation and correction information from a user.

2. The method according to claim 1, wherein:
   a validation data gatekeeper evaluates the relevance of the user's validation and correction information for machine learning training and excludes non-relevant validation and correction information.

3. The method according to claim 1, further comprising the step of:
   providing a model quality gatekeeper comparing the performance of historical and competing trained extraction models for an extraction entity and assigning the best performing extraction model to the extraction entity.

4. The method according to claim 1, further comprising the step of:
   providing an extraction model which is retrained based on a user's validation and correction information related to an extraction entity of a document type, and the newly trained extraction model used for extracting information from a document file of a different user, where the document file is of a different document type but contains the same extraction entity.

* * * * *